US006339438B1

(12) United States Patent
Bates et al.

(10) Patent No.: US 6,339,438 B1
(45) Date of Patent: Jan. 15, 2002

(54) SCROLL BAR WITH INTEGRATED ADVERTISEMENT

(75) Inventors: Cary Lee Bates; Paul Reuben Day; John Matthew Santosuosso, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,715

(22) Filed: Jul. 27, 1999

(51) Int. Cl.⁷ .................................................. G09G 5/34
(52) U.S. Cl. ..................................................... 345/787
(58) Field of Search ............................... 345/112, 123, 345/124, 125, 973, 786, 787

(56) References Cited

U.S. PATENT DOCUMENTS

| | | | |
|---|---|---|---|
| 4,831,556 A | 5/1989 | Oono ......................... 364/521 |
| 5,075,673 A | 12/1991 | Yanker ....................... 340/710 |
| 5,122,785 A | 6/1992 | Cooper ....................... 340/710 |
| 5,196,838 A | 3/1993 | Meier et al. ................. 340/724 |
| 5,202,961 A | 4/1993 | Mills et al. .................. 395/159 |
| 5,265,246 A | 11/1993 | Li et al. ...................... 395/600 |
| 5,313,229 A | 5/1994 | Gilligan et al. ............. 345/157 |
| 5,333,247 A | 7/1994 | Gest et al. .................. 395/138 |
| 5,339,391 A | 8/1994 | Wroblewski et al. ....... 395/157 |
| 5,371,846 A | 12/1994 | Bates .......................... 395/157 |
| 5,374,942 A | 12/1994 | Gilligan et al. ............. 345/157 |
| 5,418,549 A | 5/1995 | Anderson et al. ........... 345/145 |
| 5,473,344 A | 12/1995 | Bacon et al. ................ 345/163 |
| 5,491,781 A | 2/1996 | Gasperina ................... 395/157 |
| 5,495,566 A | 2/1996 | Kwatinetz ................... 395/157 |
| 5,506,951 A | 4/1996 | Ishikawa .................... 395/157 |
| 5,526,480 A | 6/1996 | Gibson ....................... 395/154 |
| 5,528,259 A | 6/1996 | Bates et al. ................. 345/121 |
| 5,528,260 A | 6/1996 | Kent ........................... 345/123 |
| 5,530,455 A | 6/1996 | Gillick et al. ............... 345/163 |
| 5,532,715 A | 7/1996 | Bates et al. ................. 345/123 |
| 5,550,969 A | 8/1996 | Torres et al. ................ 395/159 |
| 5,553,225 A | 9/1996 | Perry ........................... 395/157 |
| 5,581,275 A | 12/1996 | Glei et al. ................... 345/123 |
| 5,633,657 A | 5/1997 | Falcon ........................ 345/145 |
| 5,680,561 A | 10/1997 | Amro et al. ................. 395/341 |

(List continued on next page.)

FOREIGN PATENT DOCUMENTS

| | | | |
|---|---|---|---|
| EP | 0459174 A2 | 12/1991 | ........... G06F/3/033 |
| EP | 0967541 A1 | 12/1999 | ........... G06F/3/033 |

OTHER PUBLICATIONS

"Class specification for java.awt.Scrollbar", *Java Development Kit 1.2*, Sun Microsystems (1997).
"New Common User Access Control: Pushpad for Greater Mouse Productivity", *IBM® Technical Disclosure Bulletin*, vol. 37, No. 08, (Aug. 1994), pp. 497–499.
Speed–Sensitive Scroll Widgets, *IBM® Technical Disclosure Bulletin*, vol. 38, No. 01, (Jan. 1995), pp. 483–484.
"Part 1 Your First Day at the Office", *Getting Results with Microsoft® Office 97 Real World Solutions for the Work You Do*, Microsoft Corporation, (1995–96), pp. 62–65, 74–75, and 78–80.
U.S. Department of Commerce Patent and Trademark Office, *Automated Patent System (APS) Workstation Quick Reference Guide for the Third Generation Workstation (3GWS)*, APS–TR–TRG–30–05.03, (Mar. 27, 1996).
"Delrina 7.0 WinFax Pro Getting Started Guide", *Getting Started Basics*, (Apr. 1996), pp. 5–11.

*Primary Examiner*—Almis R. Jankus
*Assistant Examiner*—G. F. Cunningham
(74) *Attorney, Agent, or Firm*—Wood, Herron & Evans LLP

(57) ABSTRACT

An apparatus, program product and method display an advertisement on at least a portion of a scroll bar. Doing so permits advertisements to be presented to users with reduced impact on the available space on a computer display, thereby maximizing usage of the computer display and limiting any potential associated negative impacts on user productivity.

32 Claims, 6 Drawing Sheets

U.S. PATENT DOCUMENTS

| | | | |
|---|---|---|---|
| 5,740,549 A | * 4/1998 | Reilly et al. | 705/14 |
| 5,838,320 A | 11/1998 | Matthews, III et al. | 345/341 |
| 5,850,531 A | 12/1998 | Cox et al. | 345/349 |
| 5,867,678 A | 2/1999 | Amro et al. | 345/347 |
| 5,872,566 A | 2/1999 | Bates et al. | 345/341 |
| 5,874,961 A | 2/1999 | Bates et al. | 345/341 |
| 5,877,766 A | 2/1999 | Bates et al. | 345/357 |
| 5,896,132 A | 4/1999 | Berstis et al. | 345/341 |

* cited by examiner

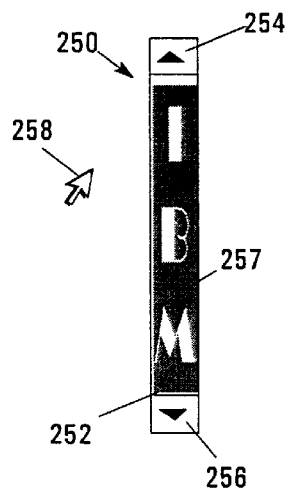
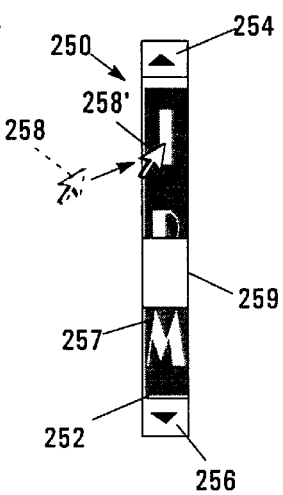
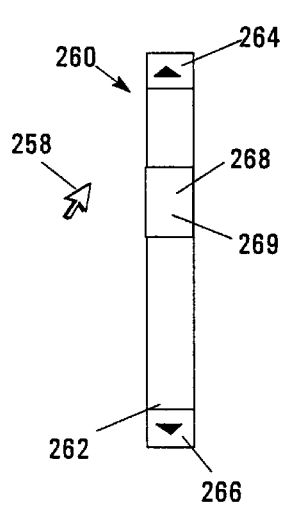
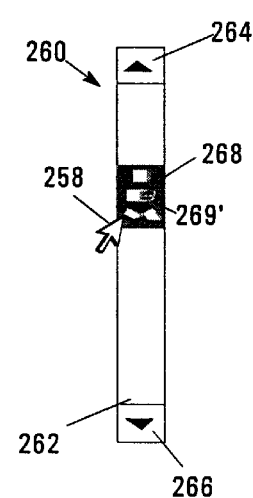
FIG. 9A     FIG. 9B     FIG. 10A     FIG. 10B
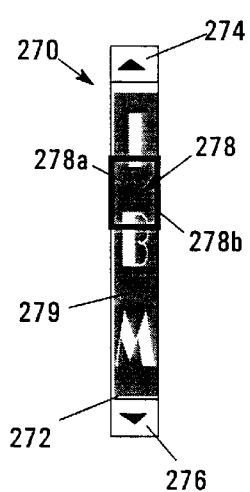
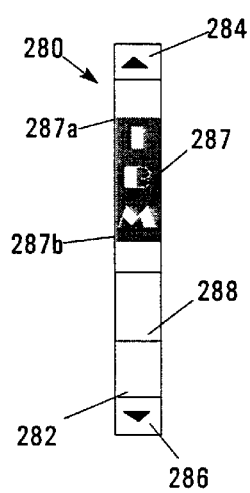
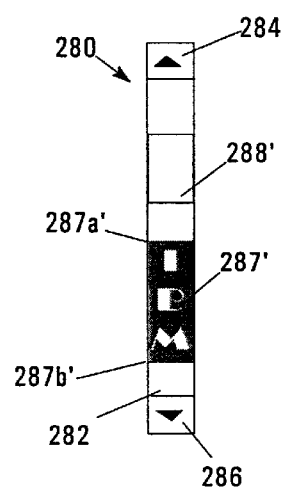
FIG. 11     FIG. 12A     FIG. 12B

SCROLL BAR WITH INTEGRATED ADVERTISEMENT

FIELD OF THE INVENTION

The invention is generally related to computers and computer software. More specifically, the invention is generally related to a scroll bar user interface control used in a graphical user interface computer environment.

BACKGROUND OF THE INVENTION

Many computers use graphical user interfaces (GUI's) to permit user interaction with information stored in such computers. In a GUI environment, users are typically able to interact with a computer through intuitive operations such as "pointing and clicking" on various graphical display elements displayed on a computer display with a graphical pointer controlled by a mouse or other user interface device.

One common type of display element used in GUI environments is a window display element, or window. A window typically includes a rectangular frame with a display region defined within the frame to display content information associated with the window. For example, windows are typically used by computer programs known as web browsers to display content information downloaded from the Internet.

Often the display region of a window is not capable of displaying all of the content information associated with the window, so a user interface control such as a scroll bar is utilized to permit a user to "scroll" the window to view different portions of the content information.

A scroll bar typically permits a user to scroll in a predetermined direction (e.g., vertically or horizontally) through manipulation of various controls on the scroll bar. For example, many scroll bars include an elongated background or scroll region that represents the overall size of the document. A puck or slider is anchored on the scroll region at the relative position of the portion of the content information that is displayed in the window. The puck may be a fixed size, or may have a variable size along the length of the scroll region to represent the relative size of the portion of the content information displayed in the window. By depressing a mouse button while the pointer is disposed over the puck, and then moving the pointer along the length of the scroll region while the mouse button is depressed, a user is typically permitted to scroll through the document (an operation known as "dragging" the puck).

A scroll bar may also include a pair of arrow buttons disposed at each end of the scroll region to permit incremental (e.g., line-by-line) scrolling through the window content information. Moreover, some scroll bars additionally permit a user to scroll in larger increments (e.g., screen-by-screen or page-by-page) by pointing and clicking directly on the scroll region.

Windows often assist in managing the amount of visible information displayed on the limited display area provided on a computer display. To maximize the amount of information displayed by a window, however, it is often desirable to maximize the relative size of the display region of the window relative to other components displayed in the window, including for example the frame and any scroll bar, as well as various title bars, tool bars, menu bars, status bars, etc. Moreover, particularly for commercial information such as information downloaded from the Internet, one or more advertisements may be displayed alongside information requested by a user, whether in the display region of the window or in a component such as a title or status bar, or in a separate window. Regardless of how such advertisements are displayed, however, the advertisements occupy space on the computer display that could otherwise be used to displayed the information requested by the user.

Any material displayed in a window, other than the information specifically requested or desired by a user, can limit the user's productivity and efficiency, particularly whenever a user is required to scroll more frequently to view the information. As such, a significant need continues to exist for a manner of more efficiently utilizing the available space on a computer display.

One specific area where space is often utilized inefficiently is within a scroll bar, and specifically on the scroll region and puck. In some conventional scroll bar designs, additional display elements and controls may also be displayed on a scroll bar, e.g., to indicate the relative locations of certain points in the content information of a window, or to indicate the amount of time spent viewing certain locations in the window content information, among others. Also, in some designs pucks are provided with various icons, e.g., to represent a third scrolling dimension.

In general, however, the additional display elements displayed on conventional scroll bar designs have been limited to either controls for scrolling to, or indicators for indicating the relative location of, certain content information in a window. Put another way, all display elements displayed on conventional scroll bars have tended to be associated in some way with facilitating the usage of the scroll bar.

Even when such additional display elements are displayed on a scroll bar, however, a substantial amount of display area still tends to go unused on the scroll bar. Given the continuing need for more efficient usage of space on a computer display, it would be highly desirable to be able to utilize such unused areas on a scroll bar in a more productive manner.

SUMMARY OF THE INVENTION

The invention addresses these and other problems associated with the prior art by providing an apparatus, program product and method in which an advertisement is displayed on at least a portion of a scroll bar. As such, in many instances, advertising messages may be conveyed to a user with minimal (if any) impact on the available space on a computer display, which has the further beneficial effect of limiting any negative impacts on user productivity.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 9A and 9B are block diagrams of a scroll bar consistent with the invention, illustrating a hidden puck feature.

FIGS. 10A and 10B are block diagrams of another scroll bar consistent with the invention, illustrating a puck advertisement feature.

FIG. 11 is a block diagram of yet another scroll bar consistent with the invention, illustrating a clear puck feature.

FIGS. 12A and 12B are block diagrams of an additional scroll bar consistent with the invention, illustrating a position sensitive background advertisement feature.

DETAILED DESCRIPTION

Hardware and Software Environment

Figure 1:
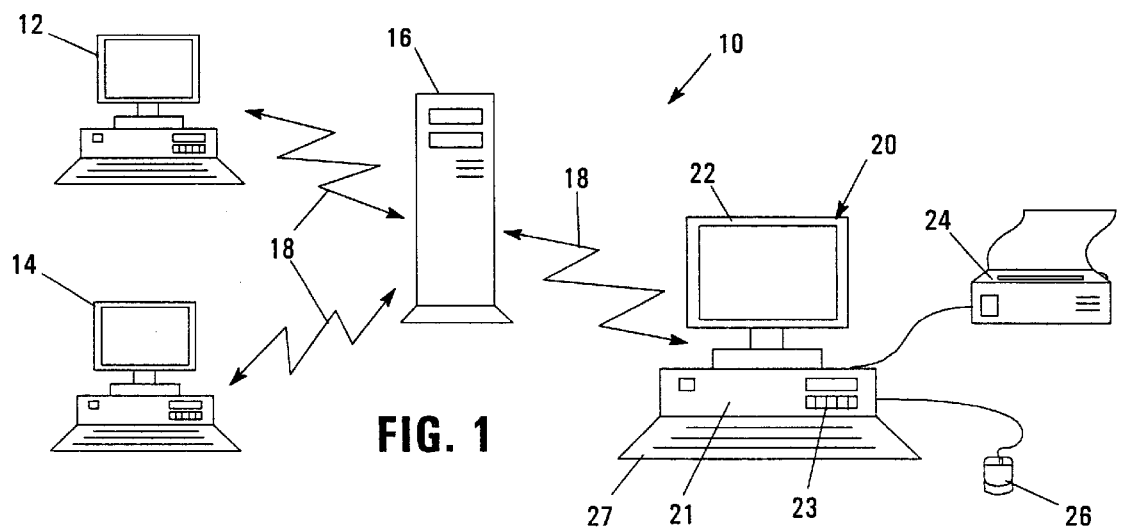
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
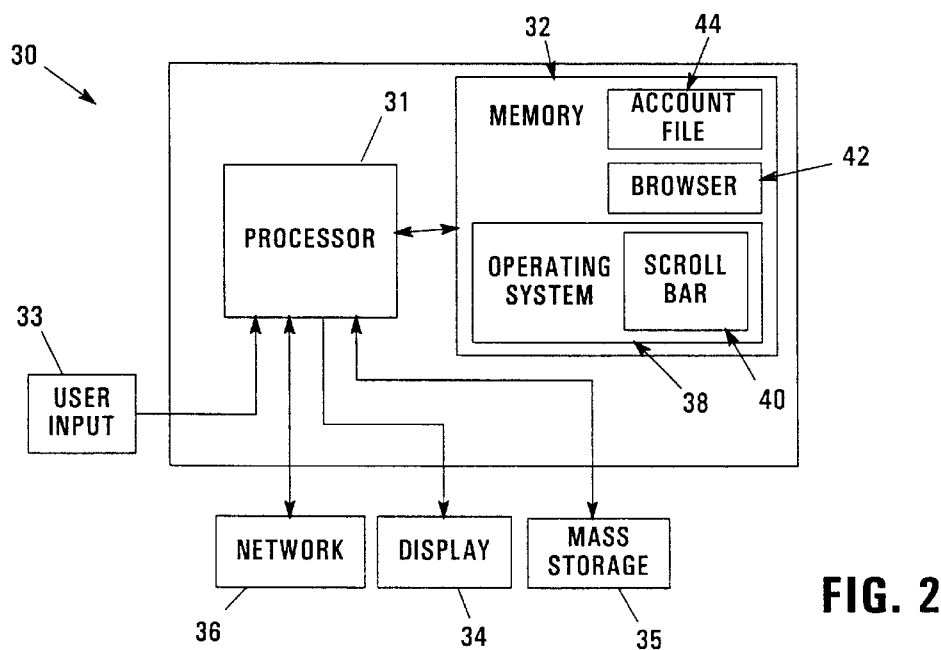
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others).

For additional storage, computer 30 may also include one or more mass storage devices 35, e.g., a floppy or other removable disk drive, a hard disk drive, a direct access storage device (DASD), an optical drive (e.g., a CD drive. a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., scroll bar 40, browser 42 and account file 44, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Scroll Bar with Integrated Advertisement

The embodiments described herein generally operate by displaying an advertisement on a scroll bar, typically in the form of a graphical image displayed on a display representation of the scroll bar on a computer display. A scroll bar may be considered to be a graphical user interface (GUI) control utilized for selecting a value or subset of values from a range of possible values for a particular variable.

A common use for a scroll bar, for example, is in connection with scrolling through the content of a GUI window. However, it will be appreciated that scroll bars consistent with the invention may also be utilized in connection with other known applications of conventional scroll bars, e.g., whenever it is desirable to select a value or subset of values from an overall range of possible values.

Figure 3:
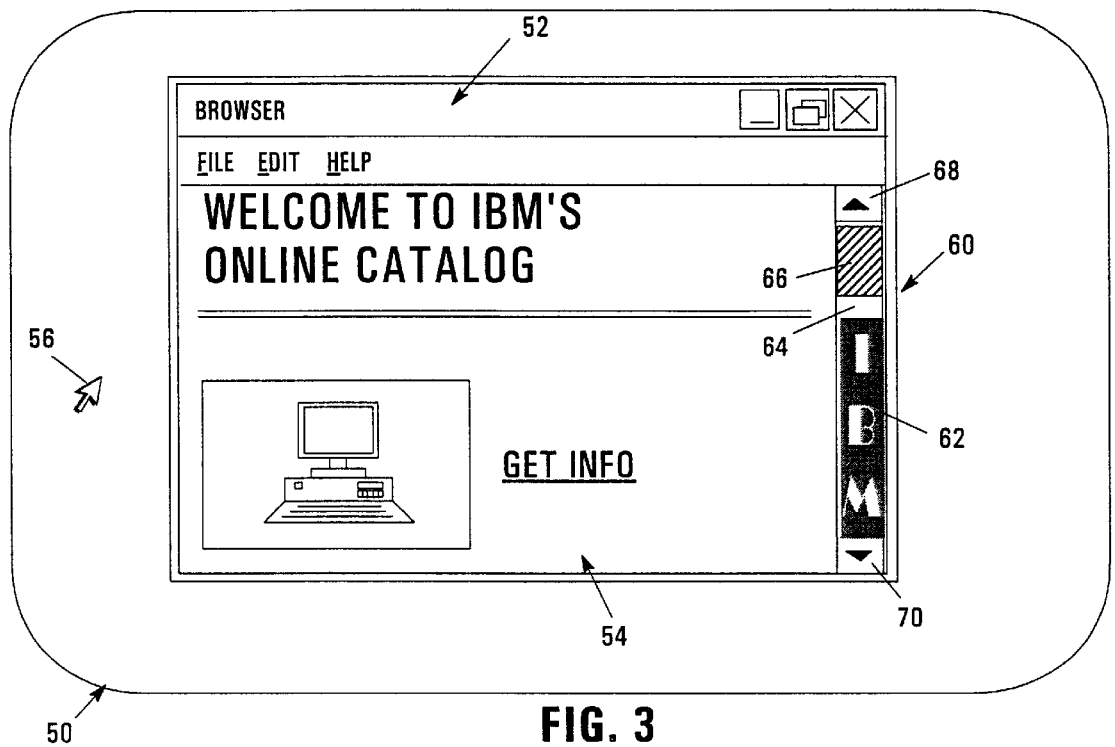
FIG. 3 is a block diagram of a computer display on which is displayed a browser window for the browser of FIG. 2, and incorporating a scroll bar consistent with the invention.

As shown in FIG. 3, for example, a computer display 50 includes a GUI window 52 for a browser 42 (FIG. 2), which in the illustrated implementation is a hypertext markup language (HTML)-based viewer within which is displayed a hypertext document 54. A user manipulates the content of window 52 principally through the use of a pointer 56 controlled by a pointing device such as a mouse. A scroll bar 60 is illustrated in window 52 for scrolling vertically through the window to display different regions of document 54. As with a conventional scroll bar, scroll bar 60 includes a scroll region 64 that represents the complete range of values (here vertical positions in window 52) that may be selected using the scroll bar.

A slider or puck 66 is positioned at a particular position along the scroll region that represents a currently-selected value in the range of values. Puck 66 may also optionally be sized along the scroll region to represent a subset of values within the overall range of values selectable by the scroll bar (here, to represent the relative portion of the document that is currently displayed within the window). Through user manipulation of puck 66 using pointer 56 (typically by a conventional "drag and drop" operation), a user is able to slide the puck along scroll region 64 to vary the currently-selected value for the scroll bar. Additional controls, e.g., arrow buttons 68, 70 which incrementally move the puck up or down, respectively, may also be provided on the scroll bar, as is well known in the art. Further, the puck may also be moved in response to keyboard input, a scroll wheel on a mouse, and selection of the scroll region, among others.

In the illustrated implementation, a scroll bar is implemented in an object-oriented environment, whereby the scroll bar is considered to include both a display representation on a computer display and the underlying program code necessary to handle user interaction with the scroll bar.

Moreover, the illustrated implementation utilizes an event-driven environment whereby user interaction with the display representation of a scroll bar results in events being passed to dedicated handling program code associated with the scroll bar. It should be appreciated, however, that in other programming and operational environments, e.g., procedural environments and the like, the program code and display representation of a scroll bar may be handled separately, and as such, the invention is not limited to any particular allocation of functionality among the various software resources in a computer to handle the display of an advertisement on a scroll bar.

Consistent with the invention, an advertisement 62 is displayed on the display representation of scroll bar 60, typically in one or both of scroll region 64 (as shown here) and puck 66. As used herein, an advertisement consistent with the invention may convey practically any message to a user, typically primarily for the commercial benefit of a party other than the user that is viewing the scroll bar. However, an advertisement may also convey other messages, e.g., public service announcements and the like, so long as such messages are not for the primary purpose of assisting a user with the manipulation of the scroll bar or the content controlled thereby.

Figure 4:
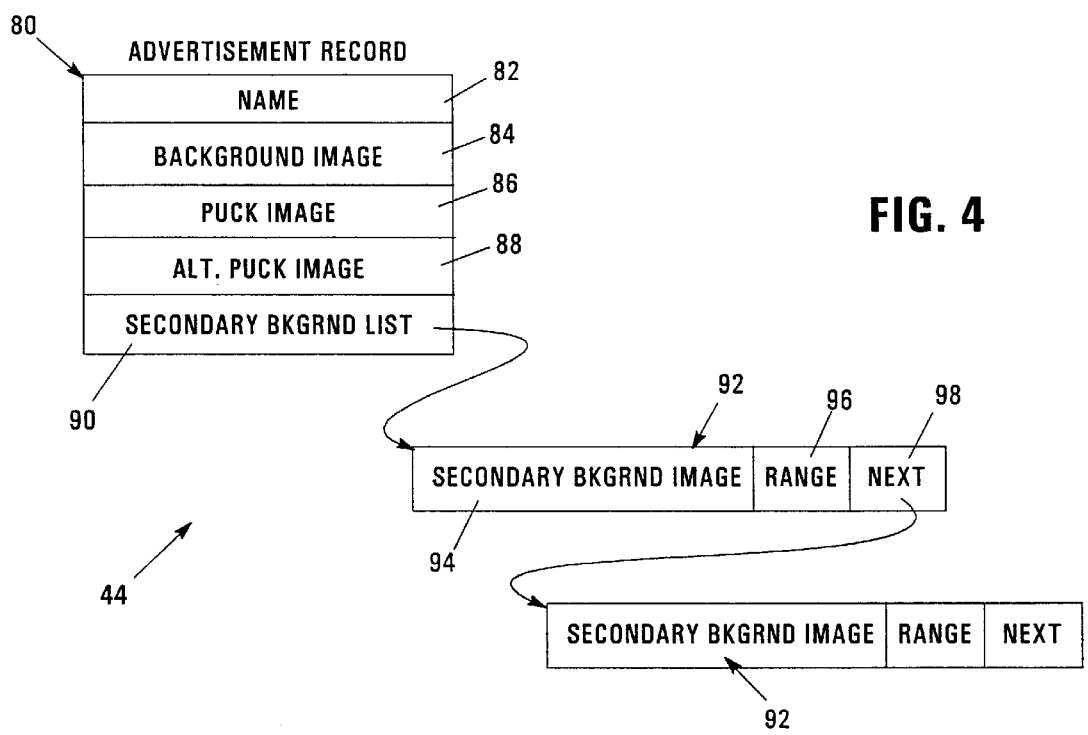
FIG. 4 is a block diagram of a representative advertisement record from the account file of FIG. 2.

In the illustrated embodiment, advertisements are stored in the form of advertisement records within a database (e.g., account file 44 of FIG. 2). As shown in FIG. 4, an advertisement record 80 may include a plurality of fields 82–90. Field 82 stores a name or other unique identifier for the advertisement, while field 84 stores a primary background image, representing a graphical image to display on the scroll region of the scroll bar.

Fields 86 and 88 respectively store primary and alternate puck images, which are selectively displayed in the illustrated implementation based upon whether the user is currently performing a drag operation on the puck. Field 90 stores a list of secondary background images that may be displayed in the scroll region of the scroll bar as an alternative to the primary background image stored in field 84. In the illustrated implementation, field 90 stores a pointer to a linked list including a plurality of secondary background image records 92, each of which includes a secondary background image field 94, a range field 96 and a next field 98. Field 94 stores a secondary background image, while field 96 stores a range parameter that specifies a range of puck positions for which display of the image is suited. Field 98 stores a pointer to the next record 92 in the linked list, with the last such record including a NULL value in field 98.

Each of fields 82–88 and 92 may store the actual image data, or in the alternative, may store a pointer, file name or other identifier that may be utilized to access a graphical image file. Moreover, any number of graphical formats, e.g., bitmap files, GIF files, JPEG files, etc., may be utilized consistent with the invention. In addition, rather than static images, an advertisement may include dynamic images such as animations and/or videos, as well as associated audio information that is played back concurrently with the display of a static or dynamic image. Moreover, it will be appreciated that the information stored in each advertisement record may be maintained in an innumerable number of alternate data structures consistent with the invention.

Figure 5:
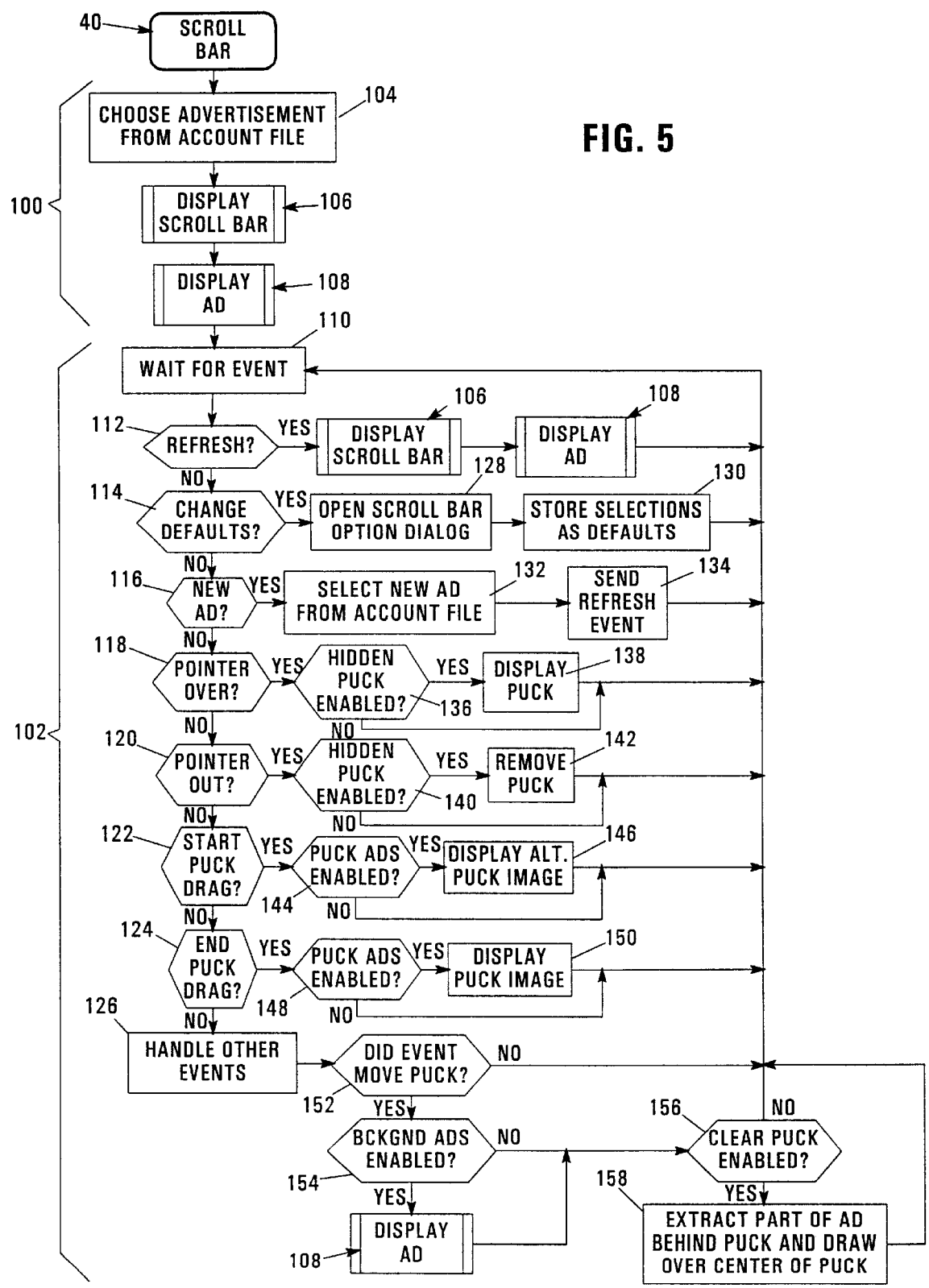
FIG. 5 is a flowchart illustrating the program flow of the scroll bar of FIG. 2.

FIG. 5 illustrates the primary program flow of a scroll bar object 40 consistent with the invention. In this figure, the functions that occur upon start-up and during usage of a scroll bar are illustrated in the same program flow. In many implementations, however, such operations are handled by separate routines, e.g., a constructor routine, illustrated at 100 and an event handler routine, illustrated at 102. It will be appreciated that the implementation of such routines, e.g., within an object-oriented event-driven environment, is within the abilities of one of ordinary skill in the art having the benefit of the instant disclosure.

Constructor routine 100 is typically executed during initialization of a scroll bar object, e.g., in response to creation and/or updating of the contents of a window such that the contents exceed the display region of the window. During construction of the scroll bar object, an advertisement is first selected from the account file (block 104), then the scroll bar is displayed by calling a display scroll bar routine 106, discussed in greater detail below. Next, the chosen advertisement is displayed on the scroll bar by calling a display ad routine 108, also discussed in greater detail below. Once constructed, control over the scroll bar then passes to event handler routine 102.

Routine 102 is illustrated as operating in a loop in which new events are waited for in block 110, with each incoming event decoded and handled by one of blocks 112–126. Blocks 112–124 represent several events that implement a number of features consistent with the invention. Other events typically handled by a conventional scroll bar may also be passed to scroll bar 40, and handling of such events in a conventional manner is represented in block 126.

One specific event handled by scroll bar 40 is a refresh event, which is detected in block 1 12, and handled by calling routines 106 and 108 in succession to redisplay the scroll bar and the advertisement thereon. Control then returns to block 110 to wait for additional events.

Another event handled by scroll bar 40 is a change defaults event, which is detected in block 114 and handled in block 128 by opening a scroll bar option dialog that permits a user to select various scroll bar options. Once the user selections are made in the scroll bar option dialog, control passes to block 130 to store those selections as defaults for the scroll bar. Control then returns to block 110. Initiation of the change defaults event may be handled in a number of manners, e.g., through selection of a menu option in the parent window, through selecting an option on a pop-up menu associated with the scroll bar, or in other manners known in the art.

Another event handled by scroll bar 40 is a new ad event, which is detected in block 116 and handled by passing control to block 132 to select a new advertisement from the account file. Once the new advertisement is selected, control passes to block 134 to send a refresh event to the scroll bar, which is handled as described above in connection with block 112. Control then returns to block 110.

Selection of a new advertisement from the account file, as well as the initial selection of an advertisement in block 104 above, may be performed in response to a number of activities. Selection of an advertisement may be performed randomly, such that a random advertisement is displayed each time a scroll bar is created. Moreover, the advertisement displayed on a scroll bar may be updated periodically, e.g., in response to expiration of a timer. Selection of an advertisement may also be context-sensitive, e.g., based upon the particular contents of a window. As one example, should a browser window display a document from a particular company's Web site, it may be desirable to choose an advertisement associated with that company, or in the alternative, one of its competitors. It may also be desirable in some implementations to select a new advertisement each time a new document is displayed in a window. Other manners of controlling both the refresh of advertisements in a scroll bar, as well as the association of the content of an advertisement with the content being manipulated by a scroll bar, may be used in the alternative.

It will also be appreciated that it may be desirable in some implementations to include account file management functionality so that advertisements may be added and/or removed from the account file. It may also be desirable to "push" advertisements to a user such that those advertisements are automatically stored in the account file in response to predetermined actions.

As one example, information for an advertisement may be encoded in a document retrieved by a user, e.g., a hypertext document retrieved over the Internet. Such an implementation would permit an author of a document to control what advertisement is displayed in connection with the document. Such information could be embedded within the document, e.g., using hypertext markup language (HTML) tags or through the use of other embedded codes such as extensible markup language (XML) tags. Other manners of providing advertisements for use by a scroll bar may be used in the alternative.

Returning to FIG. 5, another set of events that may be handled by scroll bar 40 include pointer over and pointer out events, which are respectively detected in blocks 118 and 120. A pointer over event is generated in response to a user moving a pointer onto the display representation of the scroll bar from a previous position located outside of the scroll bar. Conversely, the pointer out event is generated in response to movement of the pointer off of the display representation of the scroll bar.

The pointer over and pointer out events are utilized to manage an optional hidden puck feature that is utilized to display the puck only when the pointer is disposed within the display representation of the scroll bar. By doing so, the puck may be configured to occlude an advertisement displayed on the scroll region only when the pointer is disposed over the scroll bar, thereby leaving the scroll region unoccluded when the user is not actively manipulating the scroll bar. In the illustrated implementation, the hidden puck feature is optional, and as such, in response to a pointer over event, control is passed to block 136 to determine whether the hidden puck option is enabled. If so, the puck is displayed in block 138 at its current position, prior to control to block 110. If the hidden puck option is not enabled, however, block 138 is bypassed, and the display representation of the scroll bar is not modified in response to the event.

In response to a pointer out event, control is passed to block 140 to again determine whether the hidden puck is enabled. If so, the puck is removed from the display representation of the scroll bar in block 142, and control returns to block 110. If the hidden puck feature is not enabled, however, block 140 bypasses block 142, and returns control directly to block 110.

Blocks 122 and 124 respectively detect start puck drag and end puck drag events, which respectively represent the beginning and end of a drag operation directed to the puck of the scroll bar. Typically, the start puck event is generated when the user depresses a mouse button while the pointer is disposed over the puck. The end puck drag event is typically generated when the user releases the mouse button after moving the puck to a desired position.

The start and end puck drag events are utilized to implement another optional feature of a scroll bar consistent with the invention. In particular, these events are utilized to control the display of an advertisement on the puck of a scroll bar, by alternating between primary and secondary puck images based upon whether or not the user is currently performing a drag operation on the puck.

Specifically, in response to a start puck drag event, block 122 passes control to block 144 to determine whether the optional puck ads feature is enabled. If so, control passes to block 146 to display the alternate puck image (stored in field 88 of the advertisement record (FIG. 4)), and then return control to block 110. If the puck ads feature is not enabled, however, block 146 is bypassed, and control returns to block 110.

Similarly, in response to an end puck drag event, block 124 passes control to block 148 to determine whether the puck ads feature has been enabled. If so, control passes to block 150 to again display the primary puck image stored in field 86 of the associated advertisement record (FIG. 4). Control then returns to block 110. Returning to block 148, if the puck ads feature is not enabled, block 150 is bypassed, and control returns directly to block 110.

To handle additional features associated with the scroll bar, puck position update program code is utilized to update the scroll bar in response to other types of events, e.g., movement of the puck between the start puck and end puck drag operations.

For example, as shown at block 152, upon completion of the handling of other types of events, it is determined whether an event resulted in movement of the puck. If not, control returns to block 110. If, however, the puck did move, control passes to block 154 to determine whether background advertisements are enabled. The background advertisement feature is a feature that supports multiple background advertisements that are selected based upon the position of the puck. As such, if the function is enabled, display ad routine 108 is called to ensure that the background advertisement is updated to reflect the new position of the puck. Control then passes to block 156. Furthermore, if background ads are not enabled, block 154 bypasses routine 108 and passes control directly to block 156.

Block 156 illustrates another optional feature of the scroll bar, that of a clear puck that is utilized to permit the background advertisement that is otherwise occluded by the puck to be "shown through" a portion of the puck.

The clear puck feature is optional in the illustrated implementation, and as such, block 156 determines whether that feature is enabled. If not, control returns to block 110. However, if the function is enabled, control passes to block 158 to determine the portion of the advertisement displayed on the scroll region behind the current position of the puck. Such portion of the advertisement image is extracted and drawn over the center of the puck, leaving only the boundary of the puck displayed as a frame so that the user can determine the extents of the puck, yet still see the majority of the advertisement image in a relatively unoccluded fashion. Upon completion of block 158, control then returns to block 110 to handle additional events.

Figure 6:
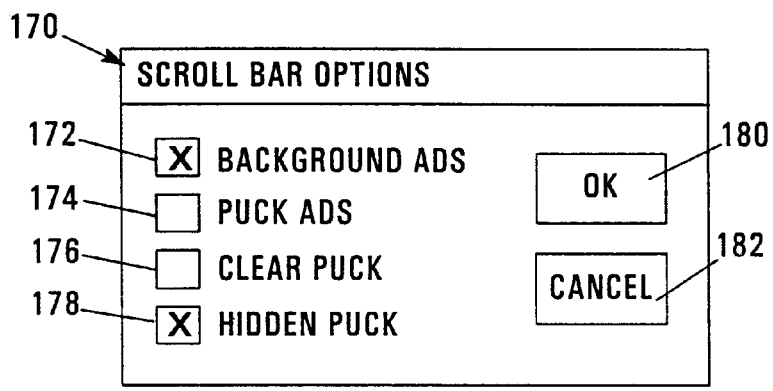
FIG. 6 is a block diagram of a scroll bar options dialog box utilized to modify the display options for the scroll bar of FIG. 2.

FIG. 6 illustrates one suitable display representation of a scroll bar options dialog box 170, opened in response to a change defaults event (block 128 of FIG. 5). As discussed above, several optional features are available for a scroll bar, including a background advertisement feature, a puck advertisement feature, a clear puck feature and a hidden puck feature, each of which is selectively enabled or disabled using a corresponding check box 172–178. Confirmation of options is provided through selection of an "ok" button 180, while exiting from dialog box 170 without modifying the settings for the scroll bar is performed by selecting a cancel button 182.

It should be appreciated that other manners of selecting optional features may be utilized in the alternative. Moreover, the scroll bar options dialog may represent the selected options for all scroll bars being displayed on a computer display. In the alternative, options may be set for scroll bars within particular windows, or with individual scroll bars on a scroll bar-by-scroll bar basis. Moreover, it should be appreciated that the various optional features may be alternatively enabled (e.g., prohibiting the hidden puck feature to be enabled whenever the clear puck function is enabled, among others). It will also be appreciated that the various optional features may be selectively omitted from some implementations, or may always be enabled, whereby the enablement controls therefore would not be displayed. Further, rather than using a hidden puck feature, a user may be able to select between puck and background ads, with puck ads displayed on the puck regardless of the position of the pointer when the puck ads feature is enabled. Other modifications will be apparent to one of ordinary skill in the art.

Figure 7:
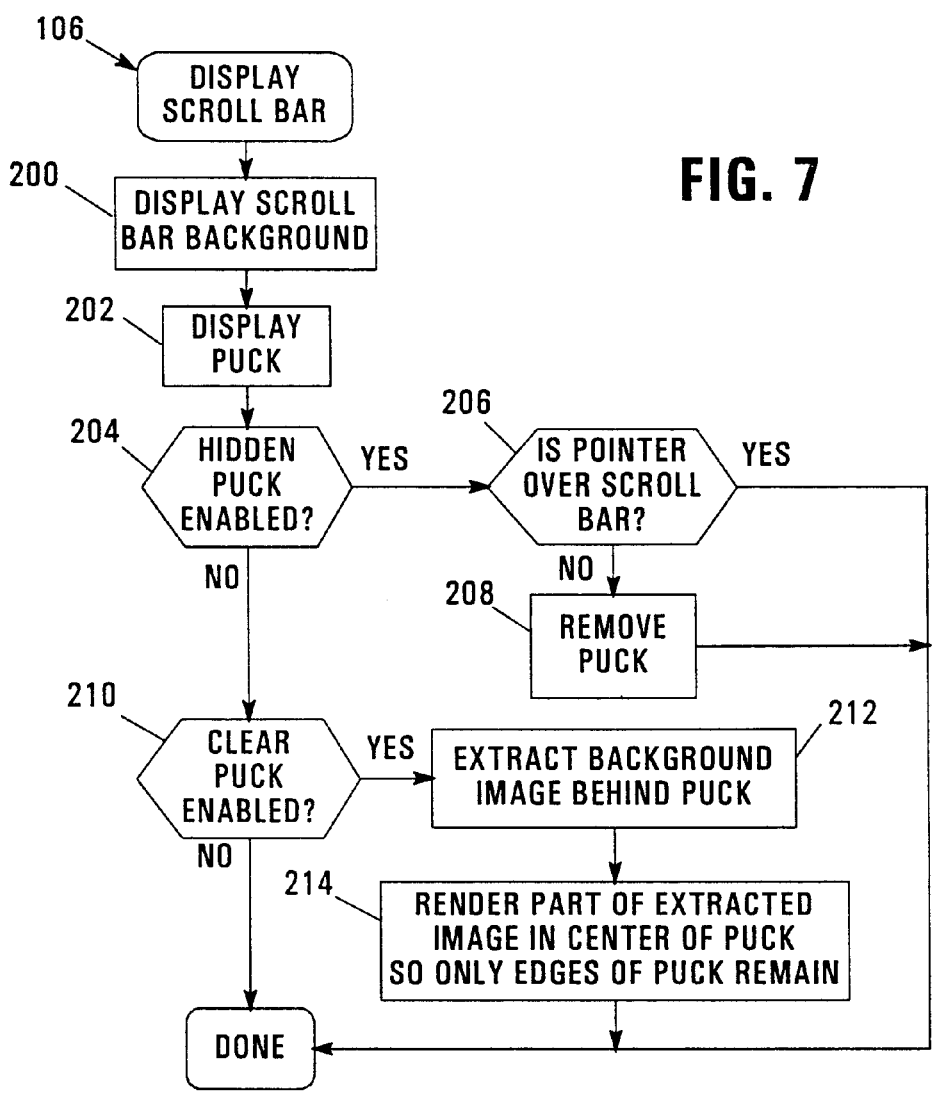
FIG. 7 is a flowchart illustrating the program flow of the display scroll bar routine referenced in FIG. 5.

FIG. 7 illustrates display scroll bar routine 106 in greater detail. Routine 106 begins in block 200 by displaying the scroll bar background, which includes the scroll region, as well as any associated controls, e.g., the arrow buttons and the like. Next, in block 202, the puck is displayed in its current position. It should be appreciated that the operations performed in blocks 200 and 202 are well known in the scroll bar art.

Next, block 204 determines whether the hidden puck feature is enabled. If so, control passes to block 206 to determine whether the pointer is disposed over the scroll bar. If so, no further operations are required, and routine 106 is terminated. However, if the pointer is not disposed over the scroll bar, control passes to block 208 to remove the puck from the display, whereby routine 106 is then complete.

Returning to block 204, if the hidden puck feature is not enabled, control passes to block 210 to determine whether the clear puck feature is enabled. If the clear puck feature is not enabled, routine 106 terminates. However, if the feature is enabled, control passes to block 212 to extract the background image behind the puck, and then to block 214 to render part of that image in the center of the puck such that only remained displayed on the display. Routine 106 is then complete.

In other embodiments, it may be desirable to implement the hidden and clear puck features without initially drawing a conventional puck, but rather drawing a filled puck only after determining the position of the pointer (for the hidden puck feature), or drawing just the boundary of the puck (for the clear puck feature).

Figure 8:
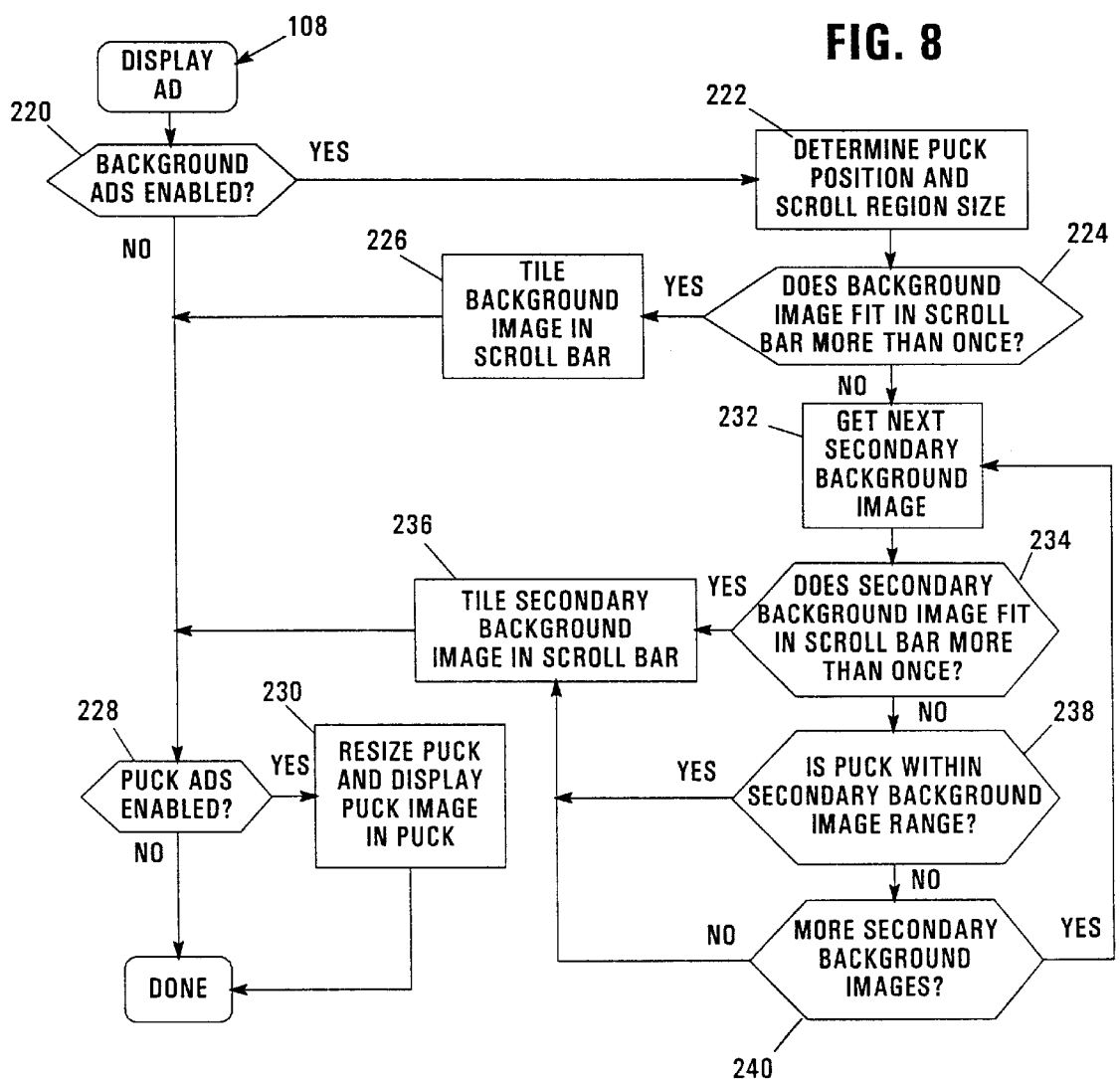
FIG. 8 is a flowchart illustrating the program flow of the display ad routine referenced in FIG. 5.

FIG. 8 next illustrates display ad routine 108 in greater detail. Routine 108 begins in block 220 by determining whether the background ads feature is enabled. If so, control passes to block 222 to determine the position of the puck and the size of the scroll region. In addition, for resizeable pucks, the relative size of the puck may also be determined in this step.

Next, block 224 determines whether the background image will fit in the scroll bar scroll region more than one time (making it likely that at least one copy of the entire image will be unoccluded on the display). If so, control passes to block 226 to tile the background image in the scroll bar scroll region. Control then passes to block 228 to determine whether the puck ads feature is enabled. If so, control passes to block 230 to resize the puck (if necessary) and display the primary puck image in the puck. Upon completion of block 230, or if the puck ads feature is found to be not enabled in block 228, routine 108 is complete.

Returning to block 224, if the background image does not fit in the scroll bar scroll region more than once, control passes to block 232 to cycle through the linked list of secondary background images to determine whether any fits in the scroll bar more than once. Specifically, block 232 gets the next secondary background image in the linked list (initially, the first secondary background image), and passes control to block 234 to determine whether that image would fit in the scroll bar more than once. If so, control passes to block 236 to tile the secondary background image in the scroll bar's scroll region. Control then passes to block 228. Returning to block 234, if the secondary background image does not fit in the scroll bar scroll region more than once, control passes to block 238 to determine whether the puck is within the range associated with the secondary background image. A puck may be determined to be in a range based on the position of either edge, the center, or both edges of the puck in various applications.

If so, control passes to block 236 to tile that image in the scroll bar. Otherwise, control passes to block 240 to process additional secondary background images. If more such background images exist, control passes to block 232 to obtain the next secondary background image. However, once all secondary background images in the linked list have been processed, control passes to block 240 to tile the last secondary background image in the scroll bar.

FIGS. 9A–12B illustrate several of the above-described features in greater detail. Specifically, FIGS. 9A and 9B illustrate the hidden puck feature in greater detail. As shown in FIG. 9A, a scroll bar 250, including a scroll region 252 and arrow buttons 254, 256, includes a background image 257 that is not occluded by a puck whenever a pointer 258 is disposed outside of the display representation thereof. As shown in FIG. 9B, however, when pointer 258 is moved over the display representation of scroll bar 250 (to the position shown at 258'), a puck 259 becomes visible on the display. Once the pointer is moved off of the display representation of the scroll bar, puck 259 is removed.

FIGS. 10A and 10B illustrate the puck ads feature described above. Specifically, as shown in FIG. 10A, a scroll bar 260 includes a scroll region 262, arrow buttons 264, 266, and a puck 268. Pointer 258 is also illustrated as displayed outside of the display region of the scroll bar. With the pointer in this region, and while no drag operation is occurring with respect to the scroll bar, a first, or primary, puck image 269 is displayed on puck 268. In this implementation, a blank image is displayed as the puck image.

As shown in FIG. 10B, once pointer 258 is moved over the puck and a drag operation is initiated (e.g., by depressing the mouse button), an alternate puck image 269' is displayed on puck 268. Of course, when the drag operation is complete (e.g., when the user releases the mouse button), the original or primary puck image 269 is displayed.

FIG. 11 next illustrates the clear puck feature, whereby a scroll bar 270, including scroll region 272 and arrow buttons 274 and 276, includes a puck 278 having a central region 278a within which is displayed the underlying portion of a background image 279. A frame or border 278b of puck 278 is still displayed to delimit the boundary of the puck. However, it can be seen that the majority of the underlying background image 279 is still visible.

FIGS. 12A and 12B illustrate the usage of secondary background images that are displayed based upon the position of a puck. Specifically, as shown in FIG. 12A, a scroll bar 280 includes a scroll region 282, arrow buttons 284 and 286, and a puck 288. A first background image 287 is displayed having a range delimited at 287a and 287b. It is to be noted that puck 288 is disposed out of the range of image 287.

Next, as shown in FIG. 12B, upon movement of the puck to the position shown at 288', another secondary image 287' having a range 287a' to 287b' is displayed as an alternative to background image 287 of FIG. 12A. Thus, the scroll bar gives the visual impression of the background image moving in response to movement of the puck.

It should be appreciated that any number of background images may be utilized to permit an advertisement to be positioned at different intervals based upon the position of the puck. Moreover, rather than having images that occupy the entire scroll region, it may instead be desirable to include boundary coordinates for each image and display the image only in one position on the scroll bar, leaving the original background of the scroll region displayed in areas other than that overlapped by the displayed image. In such an implementation, a single image could be associated with different sets of coordinates, such that, based upon the position of the puck, a different set of coordinates is used to display the image.

Further, rather than tiling an image to occupy a scroll region, an image may be manipulated, e.g., by stretching the image along the axis of the scroll region. Also, it may be desirable in some instances to automatically resize the width of the scroll bar (in the direction transverse to the scroll axis) so that the aspect ratio of the image is preserved as it is stretched along the scroll axis. Moreover, in some implementations it may be desirable to utilize completely separate advertisement images as the various secondary images such that different advertisements are displayed when the puck is disposed in different positions. The size of the puck may also be dynamically adjusted based upon the size of a puck advertisement.

It should also be appreciated that each of the above-described features may be used independently of one another. Other modifications will be apparent to one of ordinary skill in the art. Therefore, the invention lies in the claims hereinafter appended.

What is claimed is:

1. A method of displaying an image on a computer display, the method comprising:
   (a) displaying a scroll bar on a computer display; and
   (b) displaying an advertisement on at least a portion of the scroll bar;
   wherein the scroll bar is a graphical user interface control.

2. The method of claim 1, wherein the scroll bar includes a scroll region and a puck.

3. The method of claim 2, wherein displaying the advertisement includes displaying an advertisement within the scroll region.

4. A method of displaying an image on a computer display, the method comprising:
   (a) displaying a scroll bar on a computer display, wherein the scroll bar includes a scroll region and a puck;
   (b) displaying an advertisement on at least a portion of the scroll bar, wherein displaying the advertisement includes displaying an advertisement within the scroll region;
   (c) updating the position of the puck on the scroll bar in response to user input; and
   (d) updating the advertisement displayed within the scroll region based on the updated position of the puck.

5. The method of claim 4, wherein updating the advertisement displayed within the scroll region includes selecting among a plurality of images responsive to the updated position of the puck.

6. The method of claim 5, wherein each of the plurality of images has a range associated therewith, and wherein selecting among the plurality of images includes comparing the updated position of the puck with the range associated with each of the plurality of images.

7. The method of claim 4, wherein updating the advertisement displayed within the scroll region includes displaying the advertisement within a portion of the scroll region that is not occluded by the puck.

8. The method of claim 3, further comprising displaying on the puck at least a portion of the advertisement in the scroll region that is overlapped by the puck.

9. The method of claim 2, further comprising displaying the puck on the scroll bar only when a user manipulated pointer is disposed over the scroll bar.

10. A method of displaying an image on a computer display, the method comprising:

(a) displaying a scroll bar on a computer display, wherein the scroll bar includes a scroll region and a puck; and (b) displaying an advertisement on at least a portion of the scroll bar, wherein displaying the advertisement includes displaying an advertisement on the puck.

11. The method of claim 10, wherein displaying the advertisement on the puck is performed in response to user manipulation of the puck.

12. The method of claim 1 1, wherein displaying the advertisement on the puck includes:

(a) displaying a first graphical image on the puck;

(b) displaying a second graphical image on the puck in response to user input to initiate a drag operation with the puck; and (c) redisplaying the first graphical image on the puck in response to user input to complete the drag operation with the puck.

13. The method of claim 1, further comprising determining the advertisement to be displayed on the scroll bar.

14. A method of displaying an image on a computer display, the method comprising:

(a) displaying a scroll bar on a computer display;

(b) displaying an advertisement on at least a portion of the scroll bar; and (c) determining the advertisement to be displayed on the scroll bar;

wherein the scroll bar is displayed with a window within which is also displayed a portion of content associated with the window, and wherein determining the advertisement to be displayed on the scroll bar includes selecting the advertisement based upon the window content.

15. An apparatus, comprising:

(a) a memory; and (b) a program, resident in the memory, the program configured to display a scroll bar on a computer display with an advertisement displayed on at least a portion of the scroll bar;

wherein the scroll bar is a graphical user interface control.

16. The apparatus of claim 15, wherein the scroll bar includes a scroll region and a puck.

17. The apparatus of claim 16, wherein the program is configured to display an advertisement within the scroll region.

18. The apparatus of claim 17, wherein the program is configured to update the advertisement displayed within the scroll region in response to an update to the position of the puck.

19. The apparatus of claim 18, wherein the program is configured to update the advertisement displayed within the scroll region by selecting among a plurality of images responsive to the updated position of the puck.

20. The apparatus of claim 19, wherein each of the plurality of images has a range associated therewith, and wherein the program is configured to select among the plurality of images by comparing the updated position of the puck with the range associated with each of the plurality of images.

21. The apparatus of claim 18, wherein the program is configured to update the advertisement displayed within the scroll region by displaying the advertisement within a portion of the scroll region that is not occluded by the puck.

22. The apparatus of claim 17, wherein the program is configured to display on the puck at least a portion of the advertisement in the scroll region that is overlapped by the puck.

23. The apparatus of claim 16, wherein the program is configured to display the puck on the scroll bar only when a user manipulated pointer is disposed over the scroll bar.

24. The apparatus of claim 16, wherein the program is configured to display an advertisement on the puck.

25. The apparatus of claim 24, wherein the program is configured to display the advertisement on the puck in response to user manipulation of the puck.

26. The apparatus of claim 25, wherein the program is configured to display the advertisement on the puck by selecting between first and second graphical images based upon whether a drag operation is being performed with the puck.

27. The apparatus of claim 15, wherein the program is configured to determine the advertisement to be displayed on the scroll bar.

28. The apparatus of claim 27, wherein the scroll bar is displayed within a window within which is also displayed at least a portion of content associated with the window, and wherein the program is configured to determine the advertisement to be displayed on the scroll bar by selecting the advertisement based upon the window content.

29. A program product, comprising:

(a) a program configured to display a scroll bar on a computer display with an advertisement displayed on at least a portion of the scroll bar; and (b) a signal bearing medium bearing the program;

wherein the scroll bar is a graphical user interface control.

30. The program product of claim 29, wherein the signal bearing medium includes at least one of a recordable medium and a transmission type medium.

31. The method of claim 1, wherein the scroll bar is configured to receive user input to select at least one value from a range of possible values for a variable.

32. The method of claim 1, wherein the scroll bar is configured to receive user input to scroll through content displayed in a graphical user interface window.

* * * * *